United States Patent [19]

Matricardi, Jr

[11] Patent Number: 5,285,936
[45] Date of Patent: Feb. 15, 1994

[54] CONVERTIBLE CARGO CARRIER

[76] Inventor: Edmund A. Matricardi, Jr, 54111-D Backlick Rd., Springfield, Va. 22151

[21] Appl. No.: 609,841

[22] Filed: Nov. 7, 1990

[51] Int. Cl.$^5$ .............................................. B60R 9/00
[52] U.S. Cl. .................................. 224/42.01; 224/328; 280/30; 280/47.26
[58] Field of Search ...................... 224/42.01, 328, 309; 280/30, 47.26, 47.371, 655.1, 47.33; 220/DIG. 6

[56] References Cited

U.S. PATENT DOCUMENTS

| | | | |
|---|---|---|---|
| 3,314,688 | 4/1967 | Guegold | 280/655.1 |
| 3,366,397 | 1/1968 | Zeilstra et al. | 280/47.26 |
| 4,085,987 | 4/1978 | Vartdal | 220/DIG. 6 |
| 4,147,369 | 4/1979 | Simpson | 280/30 |
| 4,268,050 | 5/1981 | Kennedy, Sr. | |
| 4,378,898 | 4/1983 | Smeenge et al. | |
| 4,433,804 | 2/1984 | Bott | 224/328 |
| 4,502,725 | 3/1985 | Wiant | 224/328 |
| 4,790,256 | 12/1988 | Levine | 224/328 |

*Primary Examiner*—Linda J. Sholl
*Attorney, Agent, or Firm*—Jim Zegeer

[57] ABSTRACT

A cargo carrier for vehicle tops is comprised of first and second molded clam shells with the clam shells having mated peripheral edges. The secured devices are used for mounting the first clam shell to the vehicle top and a clamp or other fastener is used for securing the clam shells together along the mated peripheral edges to form an enclosed cargo carrying space on the vehicle top. The invention is directed to providing wheels on the second clam shell and a handle system whereby when the second clam shell is removed from peripheral engagement with the first clam shell, the second clam shell serves as a carrier for goods carried in the cargo carrier. The handles for the cargo carrier may be molded in to a trailing edge of the second clam shell. In one embodiment, the handle is a U-shaped member which is slidable to a stowable position and in a second embodiment the U-shaped handle is pivotable around to be stowed in a position on the underside of the second clam shell. The second clam shell is provided with a molded space for receiving a cooler. In a further embodiment, a single wheel is provided and the handles are stowed inside the carrier and inserted into handle receptacles and latched inplace by detent means.

12 Claims, 4 Drawing Sheets

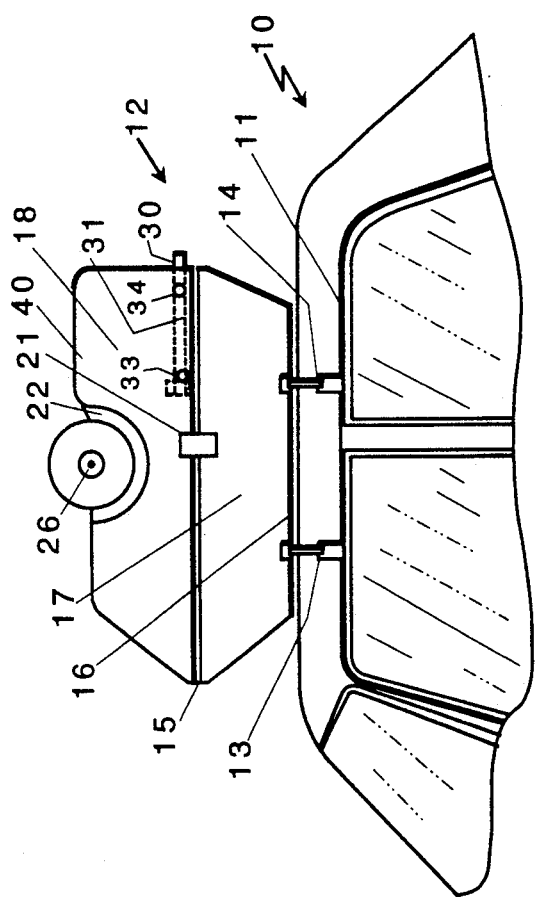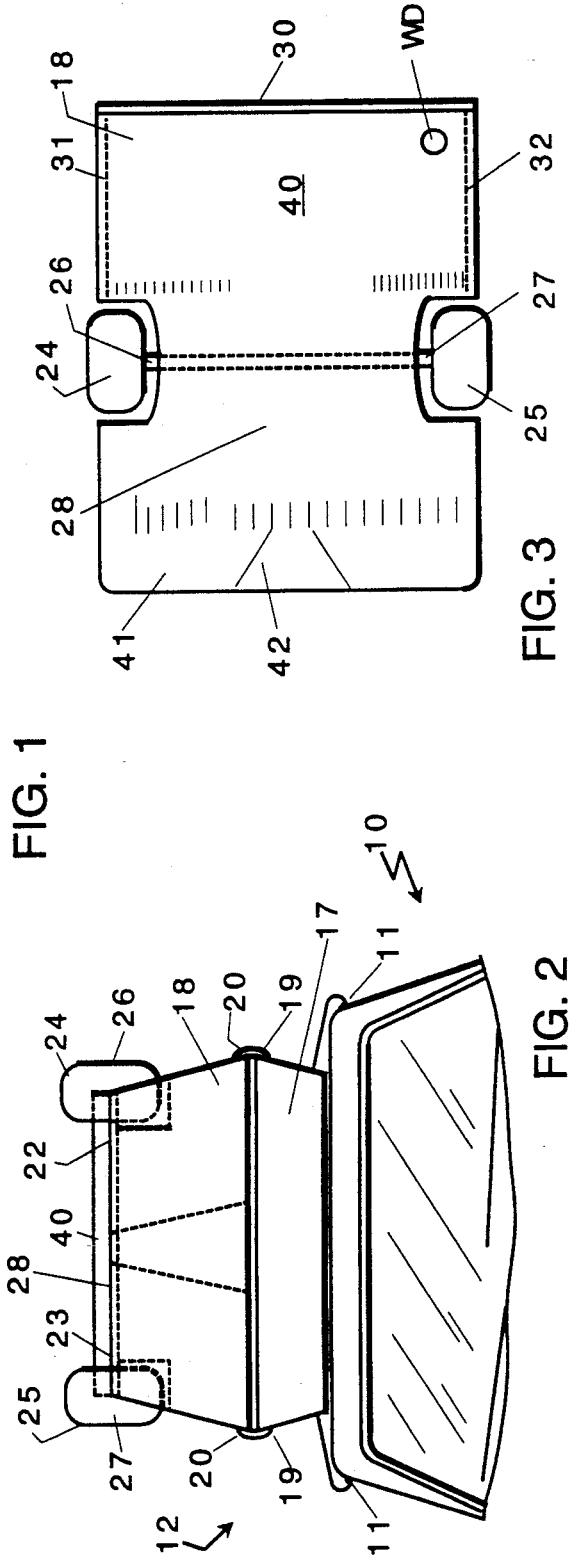
FIG. 1
FIG. 2
FIG. 3

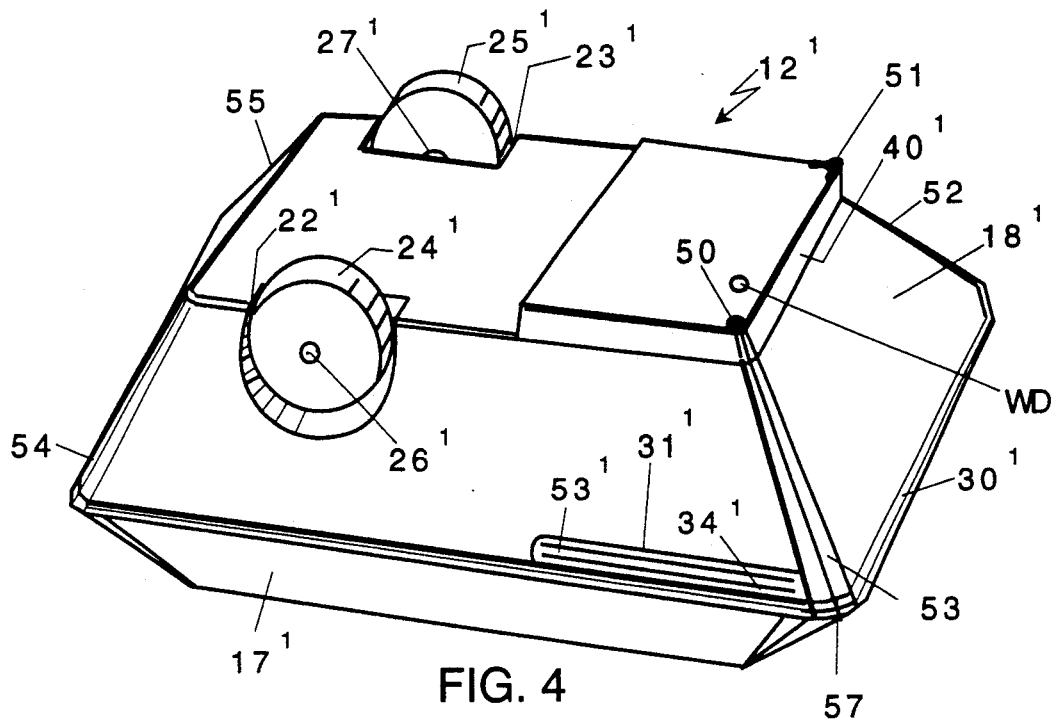
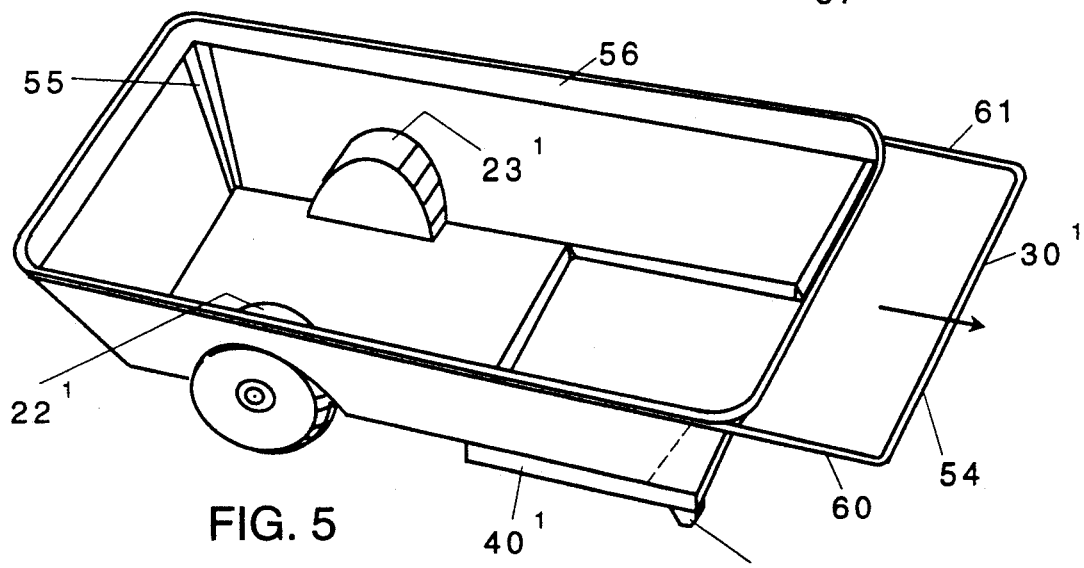
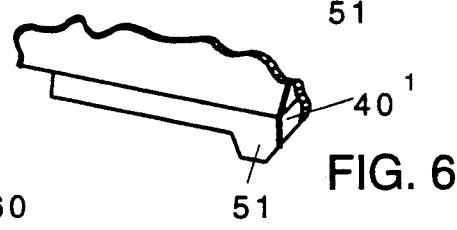
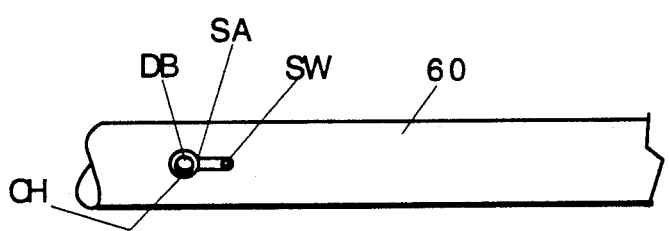

CONVERTIBLE CARGO CARRIER

BACKGROUND OF THE INVENTION

The present invention relates to cargo carriers adapted to be carried upon the roof of an automobile and, more particularly, to a cargo carrier in which the cargo carrier or a portion thereof can be utilized as a cargo carrying cart when demounted from the vehicle.

Cargo carriers have been well known in the art for many years and are a relatively inexpensive and convenient way of expanding the cargo carrying space of vehicles, such as automobiles while leaving the interior space of the vehicle more free for passenger purposes or for carrying other cargo. Such prior art systems protect the cargo while it is being carried on the roof of the vehicle from the elements.

Frequently, the vehicle must be parked some distance from the place where the cargo is to be utilized. For example, campers and sportsman such as fisherman, hunters, swimmers, campers, picnicers and the like, frequently must park their vehicles some distance from a camp site, fishing spot, or the area where they may be hunting. Carrying or portage of coolers, beach umbrellas, sporting equipment, clothes, tents and the like may require many trips to and from the vehicle with some of the equipment arriving in some disarray.

In Kennedy et al. U.S. Pat. No. 4,268,050, a relative complicated foldable rack-type device is disclosed which can be used to transport skis on the top of a car and as a hand cart to transport the skis on the ground. In Smeenge et al. U.S. Pat. No. 4,378,898, a technique is disclosed for mounting a portion of a car top carrier on a hand cart.

According to the present invention, a cargo carrier having a base or first clam shell and a top or second clam shell have their peripheral edges adapted to be sealingly mated together and mounted on a vehicle in a conventional fashion. The covering top or second clam shell is provided with a wheel assembly and handle, means so that when the second clam shell is removed from peripheral engagement with the first clam shell, the second clam shell serves as a wheel cargo carrier or cart for the contents of the cargo carrier or for other contents of the vehicle. Moreover, the handles are stowable for normal vehicular travel and unstowed for use at the location and for moving the carrier to and fro.

In a preferred embodiment, the cargo carrier has a well molded into it for easily locating a cooler for beverages, food and the like. A plugged drain is provided in the bottom of the well. In addition, this well for receiving or storing the cooler serves as a ground engaging support and may include downwardly depending ground lugs so as to provide a stable, level position for the cargo carrier cart. In a still further preferred embodiment, the wheels have relatively wide treads or tracks so that they can be moved through sand on beaches and the like to fishing locations or that will travel relatively easier over rugged mountain trails to a camp site, for example.

DETAILED DESCRIPTION OF THE DRAWINGS

Figure 8A:
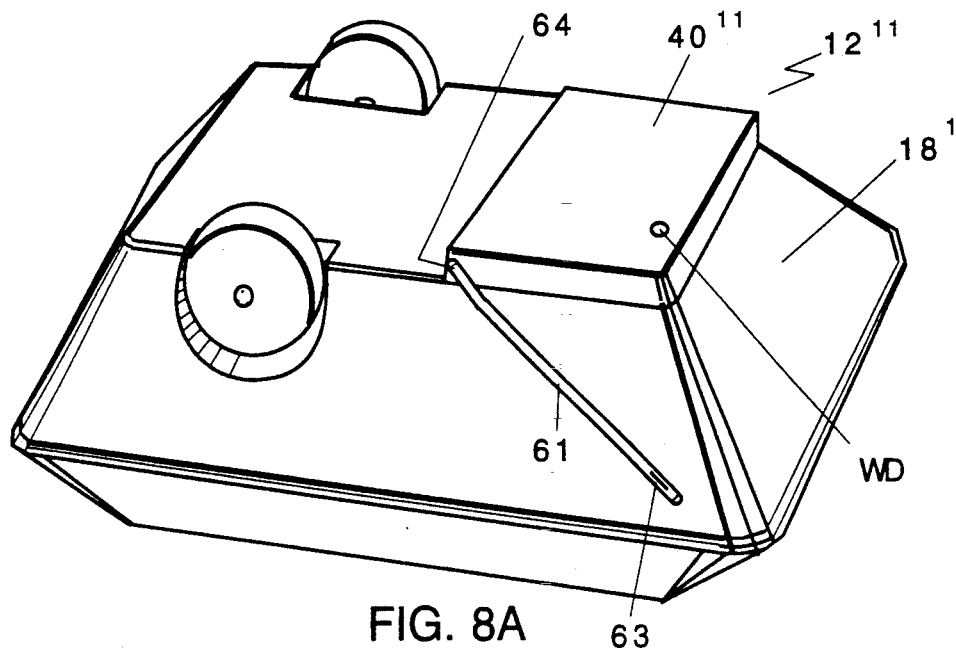
Figure 8B:
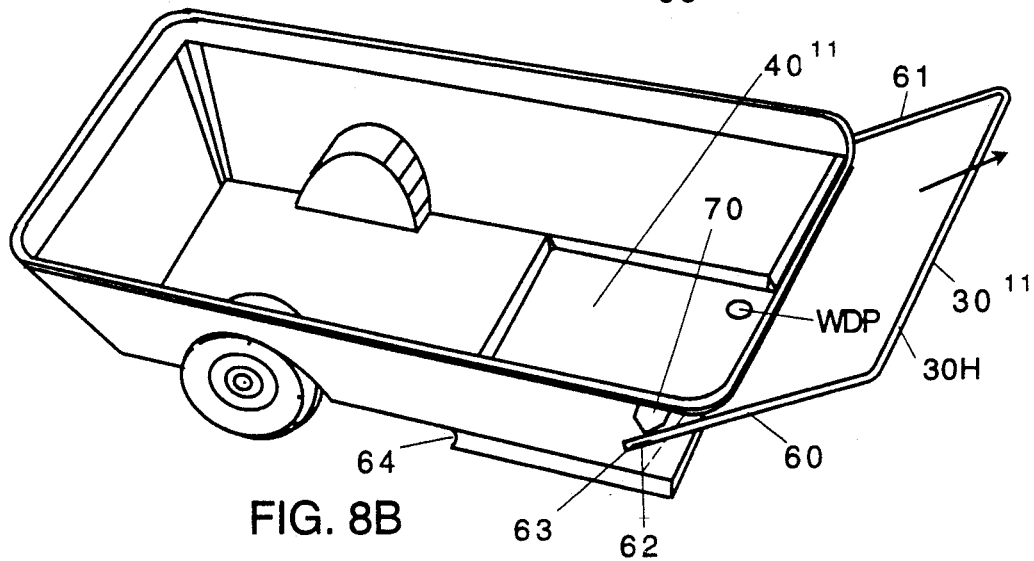
Figure 8C:
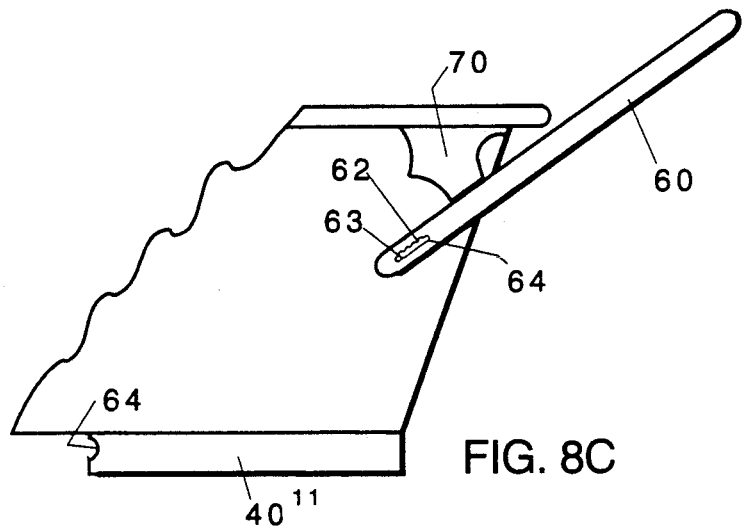
Figure 9:
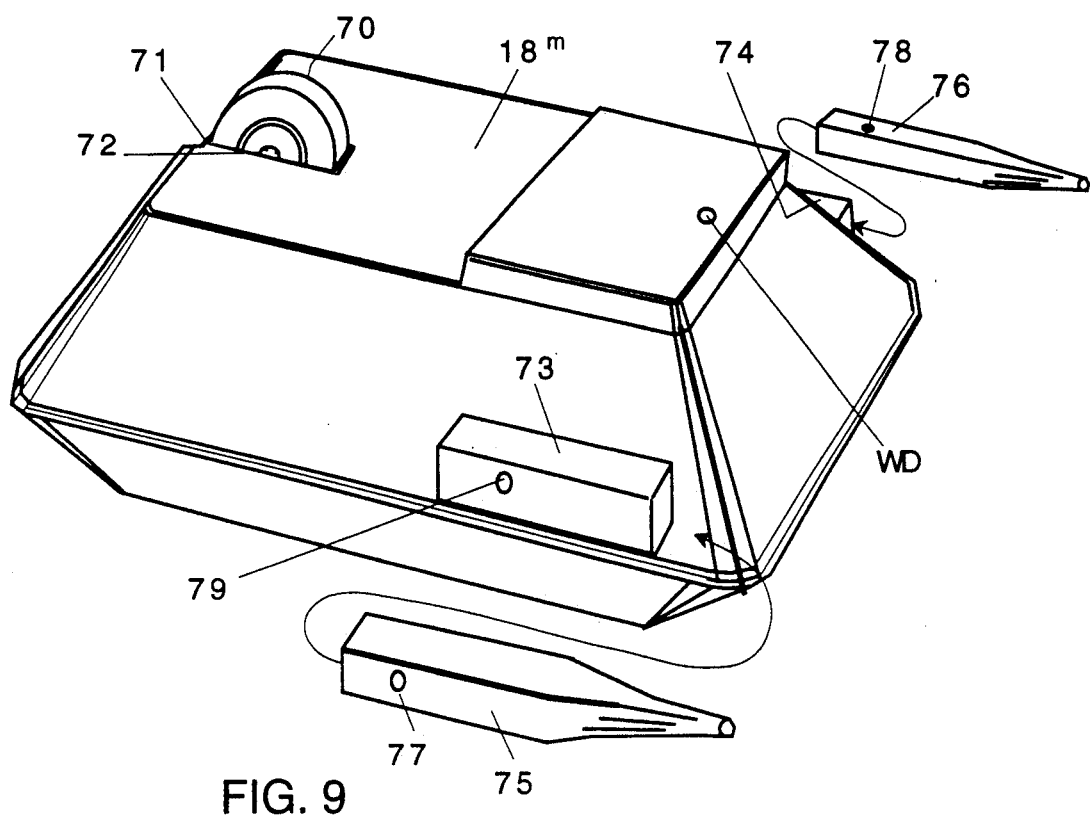
Figure 10:
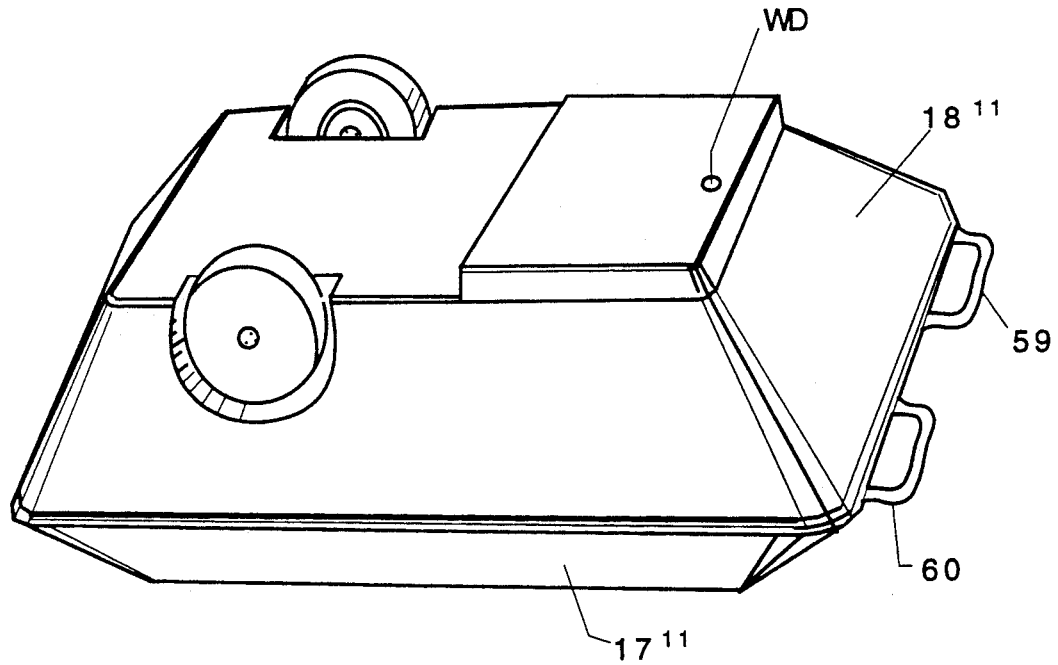

The above and other objects, advantages and features of the invention will become more apparent when considered with the following specification and accompanying drawings wherein:

FIG. 1 is a side elevational view of a cargo carrier incorporating the invention and mounted atop a vehicle, FIG. 2 is a front elevational view thereof, FIG. 3 is a bottom plan view of a cart portion of the cargo carrier illustrated in FIG. 1, FIG. 4 is a further embodiment of the invention showing some detail of how the handle is stowed, FIG. 5 is a top perspective view of the cart portion of the cargo carrier incorporating the invention, FIG. 6 is a partial sectional view showing a modification of the cart portion of the cargo carrier shown in FIG. 5, FIG. 7 illustrates the detenting action for maintaining the U-shape handle of the cart carrier portion of the embodiment shown in FIG. 4 in a stowed position and in an operating position, FIGS. 8a, 8b and 8c illustrate a further embodiment of the invention with a different technique for stowing the handle, FIG. 9 is a wheelbarrow-type embodiment of the invention with the handles received in handle sockets and detented in position and stowable within the cargo carrier for transportation, and FIG. 10 is a further embodiment of the invention showing handles molded in.

DETAILED DESCRIPTION OF THE INVENTION

Referring now to FIGS. 1, 2 and 3, an automobile 10 having a rain gutter 11 has a cargo carrier 12 secured thereto by means of conventional forward mounting bracket and straps 13 and rearward or aft mounting bracket and straps 14. These may include conventional toggle mechanisms for snugging the carrier onto a pad 15 between the lower surface 16 of the cargo carrier and the top of the vehicle. Alternatively, if the vehicle is equipped with a roof rack, then the cargo carrier 12 is secured in a conventional fashion to the roof rack. It will be appreciated that as shown in FIG. 2, that the securement of the cargo carrier 12 to the roof of the vehicle can be done on each side to gutter 11 or through other conventional mounting means.

The cargo carrier shown in FIGS. 1-3 is comprised of a base or first molded clam shell 17 and a top cover or second molded clam shell 18 with the clam shells having peripheral edges 19 and 20, respectively, which can be interfitted so as to make the cargo space encompassed or surrounded by the two clam shell halves to be waterproofed to prevent entry of water, dust and air when the vehicle is being moved at speeds, from entering the storage space. For example, the mated peripheral edges 19 and 20 of clam shells 17 and 18, respectively, can have a tongue and groove arrangement or can have a rubber grommet or seal ring so that when the two halves are mated together a good seal is formed. Alternatively, the peripheral edge of clam shell half 18 can be slightly larger than the peripheral edge 19 so as to telescope slightly over peripheral edge 19 and provide the seal. The two clam shell halves 17 and 18 are clamped together by conventional toggle clamps or latches 21 which may include a locking mechanism, if desired. Alternatively, they can be secured together by quick release fasteners such as found on suit cases and the like, so that the latching mechanism 21 can be any one of these wide variety of latching mechanism. The basic function and purpose is to maintain the two halves 17 and 19 of cargo carrier 12 in secure relation during movement of the vehicle 10.

While cargo carrier clam shell half 17 is shown as being a receptacle, it will be appreciated that it can be in some embodiments be merely a platform so it is to be understood that the term "molded clam shell" is intended to include platform-type construction as well as construction having sidewalls along with the base wall.

Up to this point, the description of the cargo carrier 12 is essentially intended to be a general description of prior art cargo carriers, the means of securing the carrier to the top of the vehicle, the means for latching the two halves of the cargo carrier together, and the fact that the two halves are molded is also deemed to be in the prior art.

The present invention is concerned with the provision of wheel means and handle means in the top or second molded clam shell half 18 of cargo carrier 12. In this embodiment, a pair of wheel wells 22, 23 are formed to each side of the clam shell half 18 and a pair of relatively wide tread wheels 24, 25 are rotatably mounted on stub axles 26 and 27, respectively, which are securely molded into the clam shell half 18 so that the wheels 24, 25 rotate freely. Although I have shown and illustrated stub axles 26, 27 for mounting the wheels for rotation, it will be appreciated that a common axle can be molded in the upper surface 28 (upper in the sense illustrated in FIGS. 1 and 2 because when used as a cart this becomes the lower surface). With the wheels 24, 25 spaced apart and having the relatively wide tread width and being balloon-type tires, the cart will move easily over sand, rocks and the like to provide easy portage for the goods transported in cargo carrier 12.

A U-shaped handle 30 is shown in a stowed position. A pair of tube members 31, 32 are provided at the lateral sides of the clam shell half 18 and telescopically receive the legs 60, 61 of the U-shaped member 30. The legs of the U-shaped member are provided with spring detents (described later herein) which coact with a pair of holes 33, 34 at each end of each tube 31, 32 and the detent members spring out into the holes 33 so as to stow the U-shaped handle in a position for movement with the vehicle in the position shown in FIG. 1 on top of the vehicle 10 and in a position for outwardly extended where the detents engage holes 34 to latch the U-shaped handle 30 in a position for operation of the clam shell half 18 as a cart for carrying cargo. As shown in FIG. 7, a detent button DB projects through detent hole DH, is mounted on a spring arm SA which, in turn, is spot welded at SW on the inner surface of arm 60 of handle 30. Depression of the detent buttons and pulling or pushing on handle 30 allows the handle to be shifted from stowed to unstowed condition and vice versa.

In the embodiment shown in FIG. 1, a portion of the rear end of clam shell half 18 has a depending pocket 40 formed therein so as to provide a space for receiving a cooler or the like for transportation to and from the site of the activity such as fishing, hunting, or camping activity, etc. Well 40 depends downwardly when the clam shell half 18 is removed from the vehicle and serves as a ground engaging member so as to maintain the cart level for loading. At the same time, any water or the like which falls into the clam shell half when it is in a cart mode, will drain to this lower portion (it is the lower portion when the clam shell half 18 is serving in the cart mode) through a drain hole WD. A plug WDP is provided to seal the drain hole WD during use as a cargo carrier on the vehicle 10. The forward end 41 may have reinforcing ribs 42 formed therein and reinforcement ribs may be formed in each of the sides if desired.

In the embodiment shown in FIG. 4, the corresponding parts have prime numerals applied. In this embodiment, the clam shell half 18' is provided with a pair of pedestals 50, 51. Moreover, in this embodiment, the clam shell half 18' which forms the cart has been reinforced with corner braces 52, 53, 54 and 55, and a peripheral edge 56 which has been reinforced for strength. In this embodiment, a laterally extending notch 57 has been molded beneath the peripheral edge 56 so as to form a storage space for retaining the transverse bar 59 of U-shaped handle 30'.

In the embodiment shown in FIG. 10, instead of a U-shaped handle, a pair of handle member grips 59 and 60 have been molded into the clam shell half 18".

Referring now to FIGS. 8a, 8b and 8c, in this embodiment, the U-shaped handle 30" has the side legs of the "U" 60, 61 pivotally mounted on pivot pins 62, 63 in the lateral sides of clam shell half 18'. In this embodiment, the lower ends of the arms 60, 61 are provided with slots 63 (they are the same on both sides and only one will be described). In addition, a latch notch 64 permits the handle to be moved along the axis of arm 60 and 61 for latching purposes to be described more fully hereafter. In the position shown in FIG. 8a, the U-shaped handle 30" has been stowed and a notch 64 in the edge of cooler well 40" receives the handle arm portion 30H as shown in FIG. 7. When it is desired to unstow the handle 30", it is translated from notch 61 with the pivot pin 62 relatively sliding in slot 63 so that the cross-member 30H of the handle 30" can be disengaged from stowing slot 64 and then rotated to the position shown in FIGS. 5, 8b and 8c, 9 where a stop shoulder 70 molded in the sidewall of the clam shell 18" and, in this position, the pivot pin 62 falls into end 64 of slot 63 so that the cart can be pushed by the handles. It will be appreciated that the cart can just as easily be pulled by the handle. The wide wheels permit easy transportation over sand and rough terrain such as mountain trails and the like.

The cart, being made of molded plastic preferably has a smooth inside so that in the event game and the like is transported back to the vehicle from the site of the activity, the cart can be hosed-out to easily clean the interior. Drain hole WD is used to remove the liquid.

Referring now to the embodiment shown in FIG. 9, in this embodiment, a single wide wheel 70 is in a forward wheel well 71 and mounted for rotation on bearing shaft 72.

A pair of handle sockets 73, 74 are molded in or otherwise secured to the sides of clam shell half 18'''. Each of the handle sockets 73 and 74 is adapted to receive a handle 75, 76, respectively, which preferably are molded and have spring detents 77, 78 secured in the sides thereof for cooperative engagement with holes 79 in handle socket 73 and a similar hole in socket 74 for cooperation with detent 78. Thus, in this embodiment, the clam shell half 18''' serves as the receptacle or cargo carrying space of a wheelbarrel. Again, the cooler well or space may be provided with projections at the corners thereof to serve as a ground engaging portion or the entire cooler receptacle space may be made deeper so as to serve this function.

While there has been shown and described preferred embodiments of the invention, it will be appreciated that various other modifications and adaptations of the invention will become readily apparent to those skilled in the art and it is intended that such obvious modifications and adaptations as occur to those skilled in the art be encompassed by the claims appended hereto.

What is claimed is:

1. In a cargo carrier for vehicle tops comprising a first and second molded clam shells, said clam shells having mated peripheral edges, respectively, means for securing said first clam shell to the vehicle top and means for securing said clam shells together along said mated peripheral edges to form an enclosed cargo carrying space on a vehicle, the improvement comprising:

said second clam shell having fore and aft bottom wall portions and sidewalls carrying one of said mating peripheral edges and fore and aft portions, wheel means mounted on said second clam shell in the fore bottom wall portion, said bottom wall in said aft bottom wall portion depending below the plane of said fore bottom wall portion and forming a ground engaging member, and handle means on said second clam shell, whereby when said second clam shell is removed from peripheral engagement with said first clam shell, said second clam shell serves as a wheeled cargo carrier.

2. The cargo carrier defined in claim 1 wherein said handle means includes means for stowing said handles when not in use.

3. The cargo carrier defined in claim 1 wherein said second clam shell has forward and aft edges and said handle means is integrally molded in said aft edge.

4. The cargo carrier defined in claim 2 wherein said means for stowing includes friction means for retaining said handle in a stowed position.

5. The cargo carrier defined in claim 4 wherein said friction means includes a groove molded in said second clam shell and said handle means includes a tubular member which is receivable in said groove.

6. The cargo carrier defined in claim 4 wherein said means for retaining said handle in a stowed position includes detent means operating between said handle and said second clam shell.

7. The cargo carrier defined in claim 1 wherein said bottom wall in said aft portion has a drain opening formed therein and a removable plug retained in said drain opening.

8. The cargo carrier defined in claim 1 wherein said ground engaging member forms a rectangular well space for receiving a rectangularly shaped article.

9. The cargo carrier defined in claim 1 wherein said second clam shell has a fore and an aft portion and said wheel means is comprised of a single wheel well formed in said fore portion.

10. The cargo carrier defined in claim 1 wherein said second clam shell includes a pair of tubular members on each side thereof and said handle means is U-shaped having a pair of legs telescopically received in said pair of tubular members, respectively, and detent means operating between said tubular members and said arms, respectively, for retaining said handle in a stowed position for travel while on a vehicle top and extended for operation when said second clam shell serves as a wheeled cargo carrier.

11. The cargo carrier defined in claim 9 wherein said handle means includes a handle socket formed on each side of the aft portion of said second clam shell, a pair of arms, one for each socket, respectively, and detent means for retaining said arms in said vehicle.

12. The cargo carrier defined in claim 1 wherein said second clam shell includes fore and aft portions and said wheel means includes a pair of wheel wells formed at the sides thereof.

* * * * *